No. 798,308. PATENTED AUG. 29, 1905.
W. J. THOMAS.
MEANS FOR SECURING HOLDBACK STRAPS TO THILLS.
APPLICATION FILED OCT. 19, 1904.
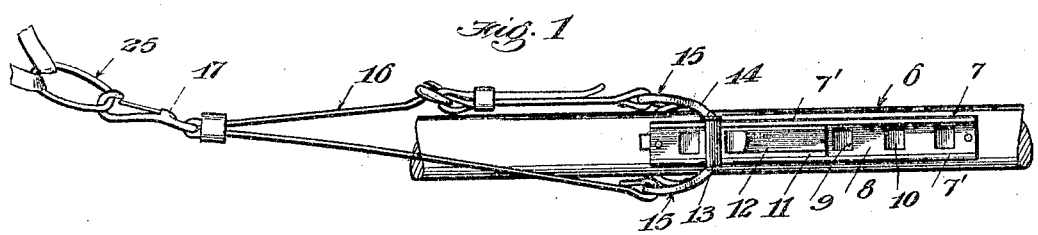
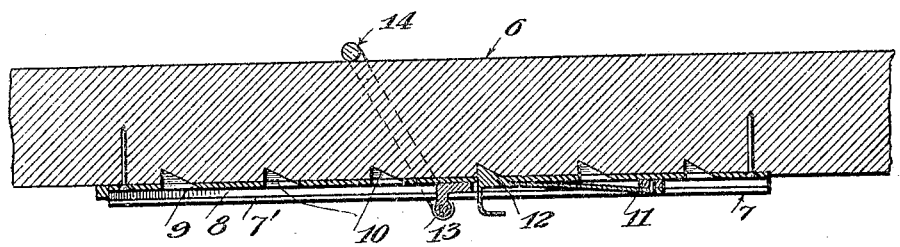
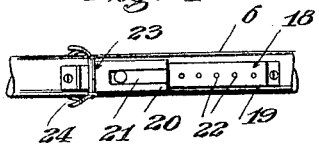
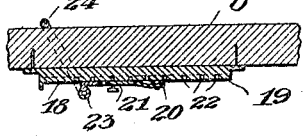
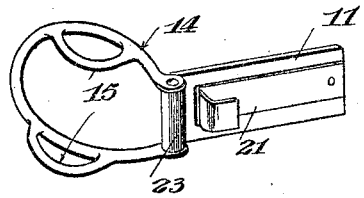
Witnesses
Inventor
William J. Thomas
by Hazard & Harpham
Attorneys

UNITED STATES PATENT OFFICE.

WILLIAM J. THOMAS, OF INGLEWOOD, CALIFORNIA.

MEANS FOR SECURING HOLDBACK-STRAPS TO THILLS.

No. 798,308.      Specification of Letters Patent.      Patented Aug. 29, 1905.

Application filed October 19, 1904. Serial No. 229,196

*To all whom it may concern:*

Be it known that I, WILLIAM J. THOMAS, a citizen of the United States, residing at Inglewood, in the county of Los Angeles and State of California, have invented new and useful Improvements in Means to Secure Holdback-Straps to Thills, of which the following is a specification.

My invention relates to adjustable fasteners for securing holdback-straps upon the thills; and the object is to facilitate the rapid and accurate adjustment of the holdback-straps to the thills of a vehicle.

Another object is to provide for an instantaneous adjustment of the straps to fit the various sizes of animals hitched to the vehicle.

I accomplish these objects by the device described herein and illustrated in the accompanying drawings, in which—

Figure 1 is a view of a thill with my fastener attached thereto. Fig. 2 is a longitudinal section of Fig. 1 with the straps omitted. Fig. 3 is a perspective view of the combined strap, holding-ring, and engaging dog. Fig. 4 is a view of a thill with my modified form of fastener applied thereto. Fig. 5 is a longitudinal section of the modified form shown in Fig. 4.

In the preferred construction, (shown in Figs. 1 to 3 of the drawings,) 6 is an ordinary vehicle-thill, and preferably secured upon the inner sides thereof and at suitable distance from the end is a plate 7, of suitable material, having turned-over edges 7', forming a guideway 8 and having openings 9, which coincide with ratchet-teeth 10, cut in the inner side of the thill. Mounted on this plate and sliding freely in the guideway is a slotted plate 11, carrying a spring-pressed dog 12, which passes therethrough and engages the teeth formed in the inner side of the thill. At one end of this plate and projecting outwardly therefrom is a tubular bearing 13, in which is mounted a ring 14, which surrounds the thill and is provided with loops 15 for the reception of the holdback-straps 16, on whose ends are secured spring-snaps 17, which engage rings 25 on the breeching. The dog 12 is of such construction that when the pull on the holdback-strap is toward the body of the vehicle the dog catches in the teeth in the thill and holds the ring from sliding backward toward the body of the vehicle; but when the pull is toward the end of the thill the dog will freely slide over the teeth and permit the ring to slide on the thill until it slides off the end thereof, thereby permitting the horse to disengage himself from the vehicle in case the swingletree should happen to break.

In my modified form of construction, (shown in Figs. 4 and 5,) the guide-plate 18 is I-shaped in cross-section and is firmly secured to the inner side of the thill. Upon the outer and inner edges 19 of the guide-plate is slidably mounted a slotted plate 20, carrying a spring-pressed pin 21, which is adapted to pass into holes 22, placed at intervals in the outer face of the I-shaped guide-plate. At one end of the plate is a tubular bearing 23, to which is secured a ring 24, similar to ring 14, and which has the same functions as hereinbefore mentioned and illustrated in my preferred construction.

It will be seen from the preceding description that I have produced a novel and inexpensive device which can be readily and permanently secured to the thills of a vehicle, rendering the holdback-straps easy of adjustment.

Having described my invention, what I claim as new, and desire to secure by Letters Patent, is—

1. A holdback-strap fastener, in combination a thill having teeth; a slidably-mounted securing-ring having a dog, on said thill, said ring encircling said thill, said dog being adapted to engage said teeth, and hold the securing-ring against movement backwardly on the thill and to slide over said teeth when the pull on said securing-ring is toward the front end of the thill and to permit said ring to slide off the forward end of said thill; and means to secure holdback-straps to said ring.

2. In combination a thill having teeth; a plate having a guideway secured to said thill and having apertures therein in register with the teeth in the thill; a slidably-slotted plate in said guideway; a securing-ring encircling said thill and having means whereby a holdback-strap may be secured thereto pivotally secured to said plate, the diameter of said ring being a little larger than the diameter of the thill; and a spring-pressed dog secured to said sliding plate, said dog being adapted to engage the teeth on said thill and hold the plate against backward movement and to slide over said teeth on a forward movement toward the outer end of the thill, and off the thill.

In witness that I claim the foregoing I have hereunto subscribed my name this 11th day of October, 1904.

WILLIAM J. THOMAS.

Witnesses:
G. E. HARPHAM,
EDMUND A. STRAUSE.